US 8,170,895 B1

(12) United States Patent
Larsen

(10) Patent No.: US 8,170,895 B1
(45) Date of Patent: May 1, 2012

(54) SYSTEM AND METHOD FOR PROBATE PREDICTION

(75) Inventor: Andrew M. Larsen, Hastings, MN (US)

(73) Assignee: Forte LLC, Minneapolis, MN (US)

( * ) Notice: Subject to any disclaimer, the term of this patent is extended or adjusted under 35 U.S.C. 154(b) by 569 days.

(21) Appl. No.: 12/355,449

(22) Filed: Jan. 16, 2009

(51) Int. Cl.
*G06Q 10/00* (2012.01)
(52) U.S. Cl. ..................................... 705/7.11
(58) Field of Classification Search .................. 705/1.1, 705/7.11
See application file for complete search history.

(56) References Cited

U.S. PATENT DOCUMENTS

| | | | |
|---|---|---|---|
| 7,191,150 B1 | 3/2007 | Shao et al. | |
| 7,401,050 B2 | 7/2008 | O'Neill | |
| 7,403,931 B2 | 7/2008 | Tayebnejad et al. | |
| 7,403,942 B1 | 7/2008 | Bayliss | |
| 7,418,431 B1 | 8/2008 | Nies et al. | |
| 2002/0091608 A1* | 7/2002 | Odegaard et al. | 705/36 |
| 2006/0085332 A1 | 4/2006 | Imrey et al. | |
| 2007/0156417 A1 | 7/2007 | Balogh | |
| 2007/0162375 A1* | 7/2007 | Delf, Jr. | 705/36 R |
| 2007/0162453 A1* | 7/2007 | Balogh | 707/10 |
| 2007/0239572 A1 | 10/2007 | Harris et al. | |

OTHER PUBLICATIONS

New EstateWise(TM) Offerings Give Creditors Comprehensive, National Probate Business Wire Dec. 16, 2008.*
O'Hare, Eileen, "PredictiveMetrics Launches CardRecovery Score", *PredictiveMetric*, Tinton Falls, NJ, news release, (Jul. 2008), 2 pgs.
Agresti, A., *Categorical Data Analysis*, John Wiley and Sons, New York, (1990), 558 pgs.
Collett, D., *Modelling Binary Data*, Chapman & Hall, London, (1991), 369 pgs.
Cox, D. R, *The Analysis of Binary Data*, Methuen and Co LTC, London, (1970), 142 pgs.
Finney, D. J, *Probit Analysis: Third Edition*, Cambridge Univeristy Press, (1971), 333 pgs.
Siddiqi, Naeem, *Credit Risk Scorecards: Developing and Implementing Intelligent Credit Scoring*, John Wiley & Sons, Inc, (2006), 196 pgs.

* cited by examiner

*Primary Examiner* — Matthew S Gart
*Assistant Examiner* — Seye Iwarere
(74) *Attorney, Agent, or Firm* — Schwegman, Lundberg & Woessner, P.A.

(57) ABSTRACT

A computer assisted method includes selecting a sample of accounts from a historical database of accounts corresponding to deceased debtors, The sample indicates whether or not an estate was found for each deceased debtor. A comprehensive set of credit related variables corresponding to the accounts is obtained from a first source. A comprehensive set of demographic related variables corresponding to the accounts is obtained from a second source. The variables are mapped to the accounts and a computer executable model is created by identifying a subset of variables from the sets of variables and using the subset of variables and sample of accounts such that the model provides a prediction of whether or not an estate exists for a given deceased debtor.

20 Claims, 4 Drawing Sheets

SYSTEM AND METHOD FOR PROBATE PREDICTION

BACKGROUND

A significant portion of the debts that people incur are not repaid in a timely fashion. Debts may include credit card debt, loan debts, unpaid bills, or a variety of other types of debt or credit obligations. Many techniques are used to try to obtain payment of such debts, including the use of computer generated models to help determine which of many collection methods are more likely to result in collection of some or all of the debt. Collection resources may then be allocated in accordance with their likelihood of success. Debt collection strategies may even be adjusted by analysis of received real time data. The problem of debt collection is compounded by the death of a debtor. Specialized collection agencies may be used when the debtor is deceased.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
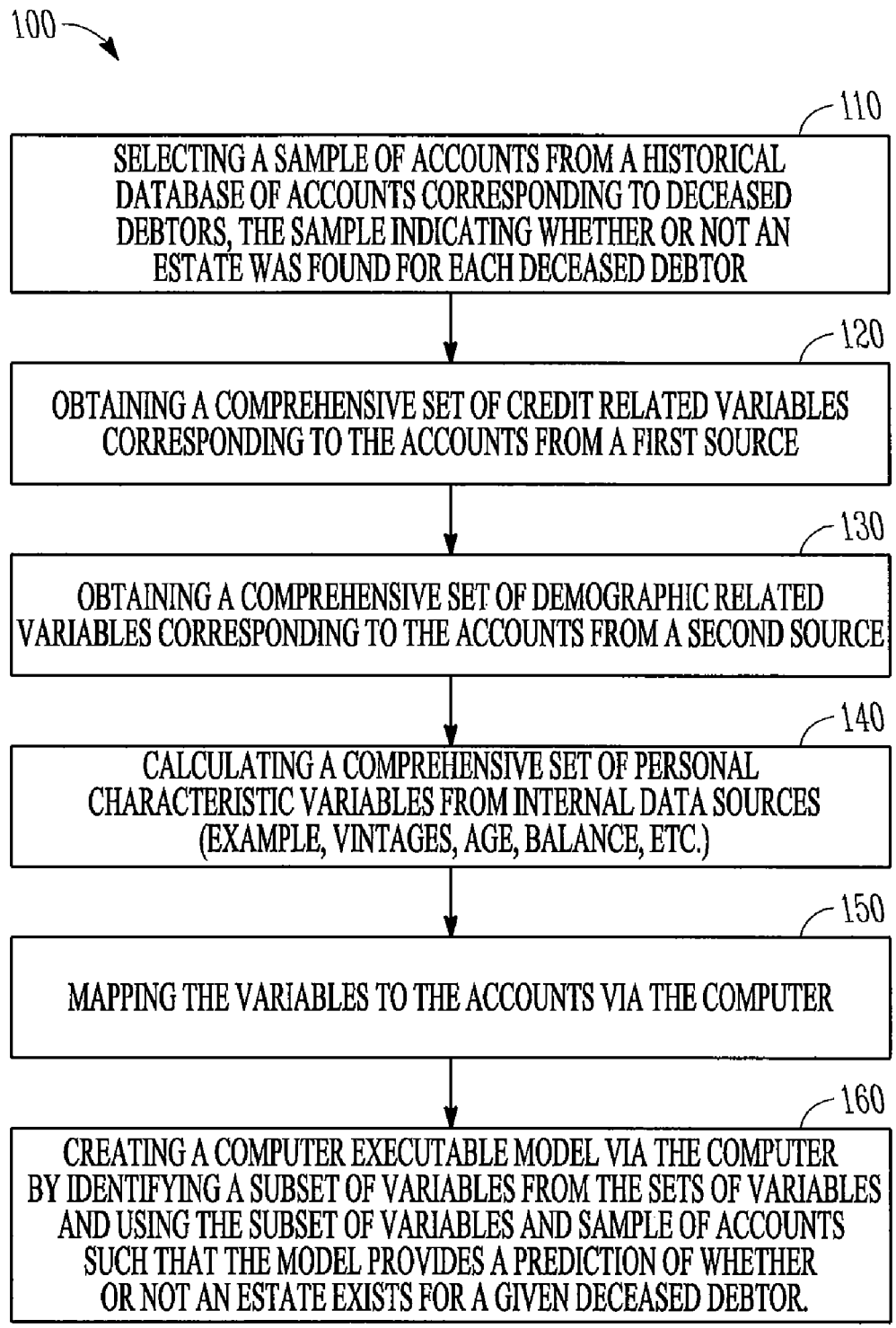
FIG. 1 is a flowchart of a computer assisted method of generating a model to determine whether an account has an associated estate according to an example embodiment.

A computer assisted method of predicting the likelihood of an estate 100 is illustrated in flowchart form in FIG. 1. At 110, the method involves selecting a sample of accounts from a historical database of accounts corresponding to deceased debtors. The sample includes an indication of whether or not an estate was found for each deceased debtor. Currently, in the US, there are more than 3400 courts in which estates may exist. Various courts may have different processes that need to be used to check for estates, making the process of finding an estate a potentially very difficult task. Until an estate is found, collection methods may involve a strategy of letters and telephone calls that can be quite time and resource consuming.

At 120, the method involves obtaining information corresponding to a comprehensive set of credit related variables that correspond to the accounts. In one embodiment, the credit information is obtained from a first source such as one or more credit reporting agencies, and may be collected electronically via computer network connections. Example credit agencies include Experian, Equifax, TransUnion and Fair-Isaac. Other internal or external credit profile sources may be used in further embodiments.

At 130, information corresponding to a comprehensive set of demographic related variables is obtained. The demographic variables are correlated to the accounts. Various census data sources, such as Claritas, Geolytics, esri, etc., may be used to obtain the information, which may also be obtained electronically. Census variables may include zip code maps correlated to household income, homeownership rates, education levels, etc.

At 140 individual characteristic variables are calculated for each debtor. Data may be obtained internally through existing account information or from third party sources if available. The information corresponding to the credit, demographic and personal characteristic variables are mapped electronically to the corresponding accounts as indicated at 150 via a computer. Using a computer to access the sample and variables, a computer executable model is created by identifying a subset of variables from the sets of variables at 160. A computer is used to run and create the model due to the complexity of such models. Using the subset of variables and sample of accounts, the model provides a prediction of whether or not an estate exists for a given deceased debtor.

In one embodiment, over a thousand variables are distilled down to approximately 70 variables that comprise the model. In further embodiments, many more variables may be considered for the model, and the number that they are distilled to may be more or less than 70. Through an iterative process, variables are eliminated and added back into the model until a desired subset of variables for the model are found. The model, using that subset of variables, provides a score indicating the likelihood of whether or not an estate exists for a given account corresponding to a deceased debtor. In one embodiment, the score is dependent on the process of identifying estates that was performed for the sample that was used to generate the model. If the process changes significantly, a new sample may be used to generate a new model once a sufficient number of accounts have been processed with the new process.

The score may be used in various embodiments to allocate resources in a desired manner. A low score, indicating that there is a low probability of finding an estate may be used to allocate resources to other estates. In other words, there is little benefit of searching hard for an estate that is not likely to exist. Alternatively, if the model indicates that an estate is likely to exist, more resources may be dedicated to finding the estate, and one may search longer if such an estate is not quickly found. In further embodiments, clients of a credit firm that searches for estates, may have several accounts corresponding to different deceased debtors. The model may be used against such accounts to identify the best candidates for estates. Since accounts with estates are more likely to result in collection of the debt, a higher yield may be obtained by selecting the accounts for processing that are most likely to have estates.

In one embodiment, selecting a sample of accounts includes keeping a sample slice out of the sample for use in testing the model. The sample of accounts may be selected from a group of accounts processed in accordance with a constant method of identifying whether or not the deceased debtors had estates. In one embodiment, the demographic data comprises at least a zip code and income information. In a further embodiment, the historical database of accounts includes further variables used to create the model.

In one embodiment, the model comprises a probit model. Alternative models may be used in further embodiments, such as logit and various neural network models. The probit model may be created using a computer assisted manual intuitive method. In a further embodiment, the probit model may be computer generated using a stepwise regression analysis. The probit model may be created using a stepwise logistical process as illustrated at 200 in FIG. 2. At 210, the model is run using the multiple sets of variables. At 220 variables may be removed that appear to be duplicative. The probit model provides a significance rating for each variable that remains in the model from the initial sets of variables. In one embodiment, a user may first make a list of variables that are intuitively believed to be relevant, such as income levels, home ownership, etc. These are listed on a theory sheet. Variables that appear to be duplicative may then be removed from the model before the model is run again. An example of duplicative variables may be 3 month and 6 month delinquency information.

At 230, the model is run again without the duplicative variables. This means that perhaps two of three variables that appear to be duplicative were removed from the model, and one of the three variables remains.

At 240 the process involves repeating the removing duplicative variables and running of the model in an empirical process to identify a preliminary subset of variables. One can note which of the duplicative variables remaining had a significance that increased or decreased, allowing the one that increased to remain in the model at the end of the empirical process. This empirical process may result in the model being reduced to include a preliminary subset of 30 to 40 variables. The model becomes much more efficient with such a reduced number of variables to consider. This model may be used on new accounts in some embodiments.

In a further embodiment, the preliminary subset of variables to be in the model at 250 along with additional variables are run in the model via multiple iterations of different sets of additional variables. At 260, multiple variables not in the preliminary subset are added to run the model with the preliminary subset of variables such that the model identifies further significant variables. In one example, the computer running the model may add five or so of the multiple variables to the model. In one example, of the 1400 or so variables not included in the preliminary subset of variables, perhaps 200 may be added when the model is re-run. In further examples, different numbers of variables may be added to the model at 260 from which to identify further significant variables. At 270 some or all of the further significant variables may be added to the subset of variables. At 280 selected variables that appear to be duplicative may be removed from the preliminary subset of variables. The processes identified at 260, 270 and 280 are iteratively run for different additional sets of variables, resulting in a final subset of variables for the model.

The probit model is a computer assisted manual intuitive approach, and the model itself is the result of a fully computer generated regression analysis. The computer generated model is further modified in an iterative process which may be referred to as a computer assisted manual intuitive modification of the computer generated model. The model itself is stored on a computer readable medium and when run on a computer system provides a device or system that can predict the likelihood of an estate being associated with an account corresponding to a deceased debtor.

In one embodiment, the model produces a z score for a selected deceased debtor. The z score may be representative of the likelihood that an account will have an estate, and a correspondingly increased chance of collecting a debt associated with the deceased debtor. In one embodiment, the z score may be normalized using a standard distribution. Then, when scaled to 1000 points, a 100 point drop corresponds to a 50% decrease in the likelihood of there being an associated estate for an account.

Method 200 is representative of a method for computing a logistical regression model in order to determine the coefficients for the probate predictor model. The computer system uses the historical information gathered in FIG. 1 to determine the model coefficients. Probability represents the debtor having a "1" outcome, meaning an estate is or will be present.

Figure 3:
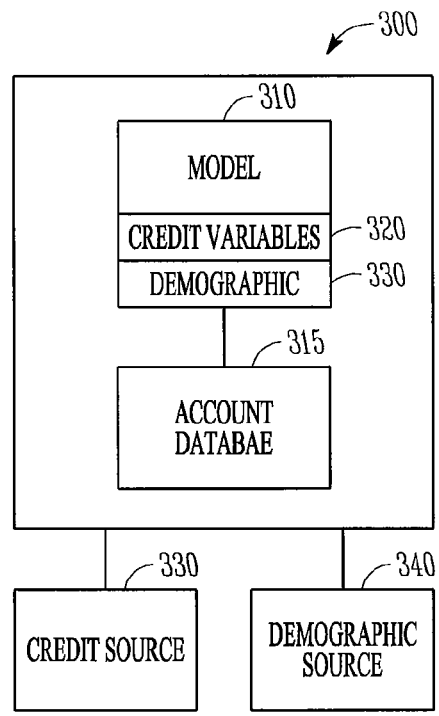
FIG. 3 is a block diagram illustrating a computer executable model stored on a computer readable medium according to an example embodiment.

In a further embodiment, the computer executable model is stored on a computer readable medium as indicated at 300 in FIG. 3. The model stored on medium 300 includes a set of variables 310 selected from credit and demographic data sources. The variables are selected by selecting a sample of accounts from a historical database of accounts 315 corresponding to deceased debtors, the sample indicating whether or not an estate was found for each deceased debtor. A comprehensive set of credit related variables 320 corresponding to the accounts is obtained from one or more first sources 330. A comprehensive set of demographic related variables 335 corresponding to the accounts is obtained from one or more second sources 340. The variables are mapped to the accounts 315, and the computer executable model 310 is created by identifying a subset of variables from the sets of variables and using the subset of variables and sample of accounts such that the model provides a prediction of whether or not an estate exists for a given deceased debtor. In one embodiment, model 310 is a probit model created using a computer assisted manual intuitive model.

Figure 4:
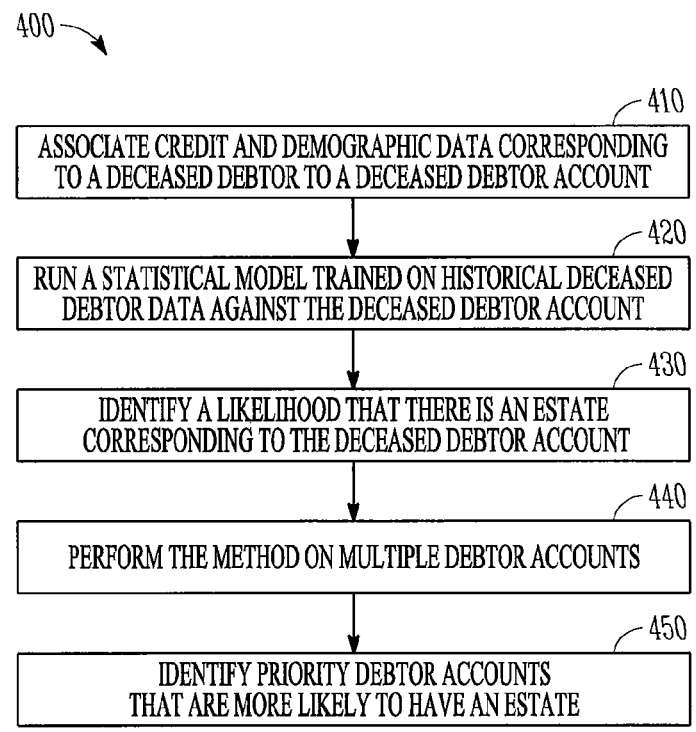
FIG. 4 is a flowchart of a computer implemented method of identifying a score indicative of whether an account has an estate according to an example embodiment.

In a further embodiment, a computer implemented method of identifying a score indicative of whether an account has an estate is shown generally at 400 in FIG. 4. Method 400 includes associating credit and demographic data corresponding to a deceased debtor to a deceased debtor account at 410. A statistical model trained on historical deceased debtor data is run at 420 against the deceased debtor account. A likelihood that there is an estate corresponding to the deceased debtor account is identified at 430. In one embodiment, the method may be performed on multiple debtor accounts as indicated at 440. The method may identify priority debtor accounts at 450 that are more likely to have an estate and thus an increased chance of collection to obtain higher collection yields. A low likelihood of the existence of an estate may be used to identify an account as a candidate for reduced collection efforts.

Figure 5:
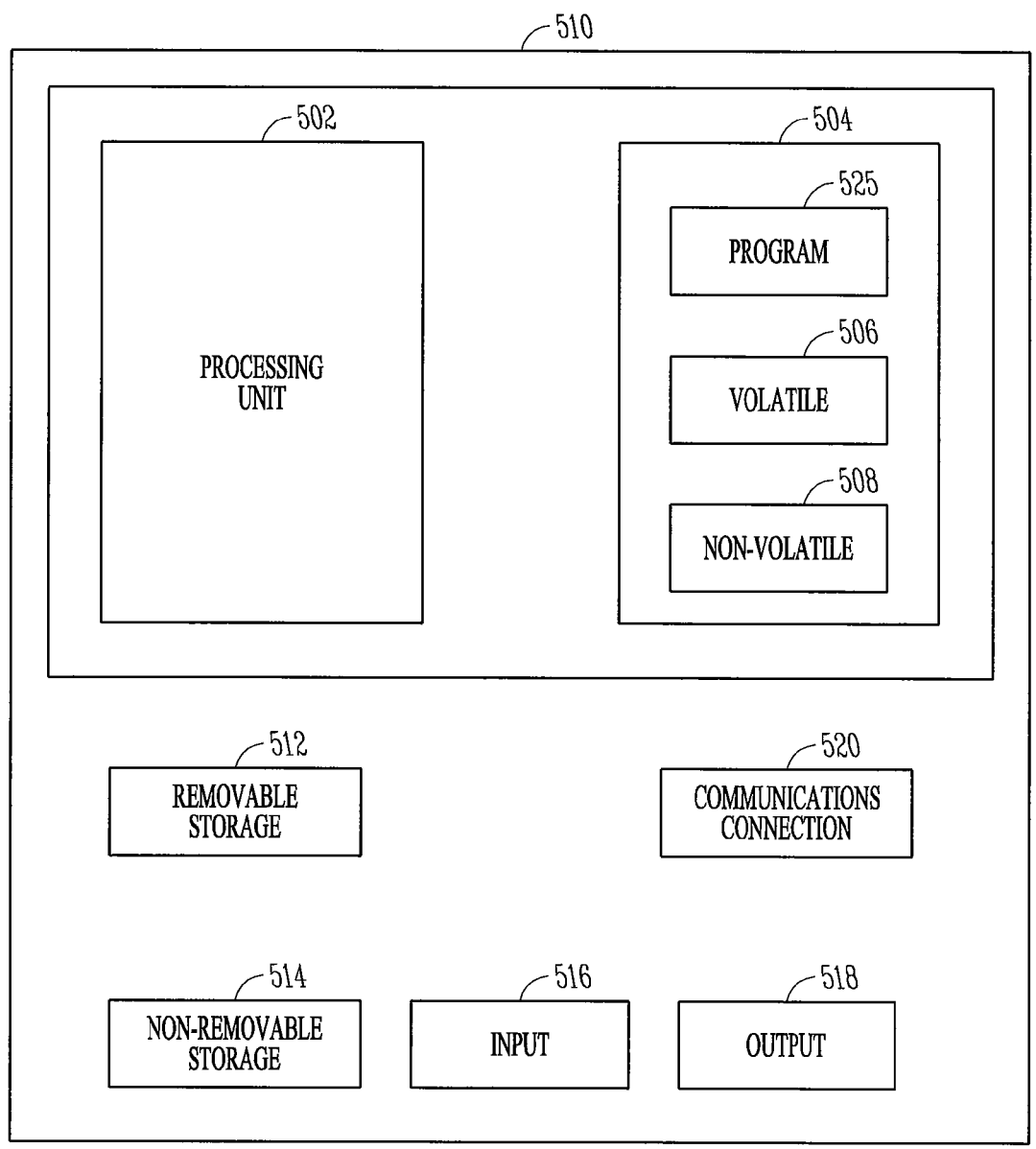
FIG. 5 is a block diagram of a computer system that executes programming for generating and running the model according to an example embodiment.

A block diagram of a computer system that executes programming for generating and running the model is shown in FIG. 5. A general computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium.

Figure 2:
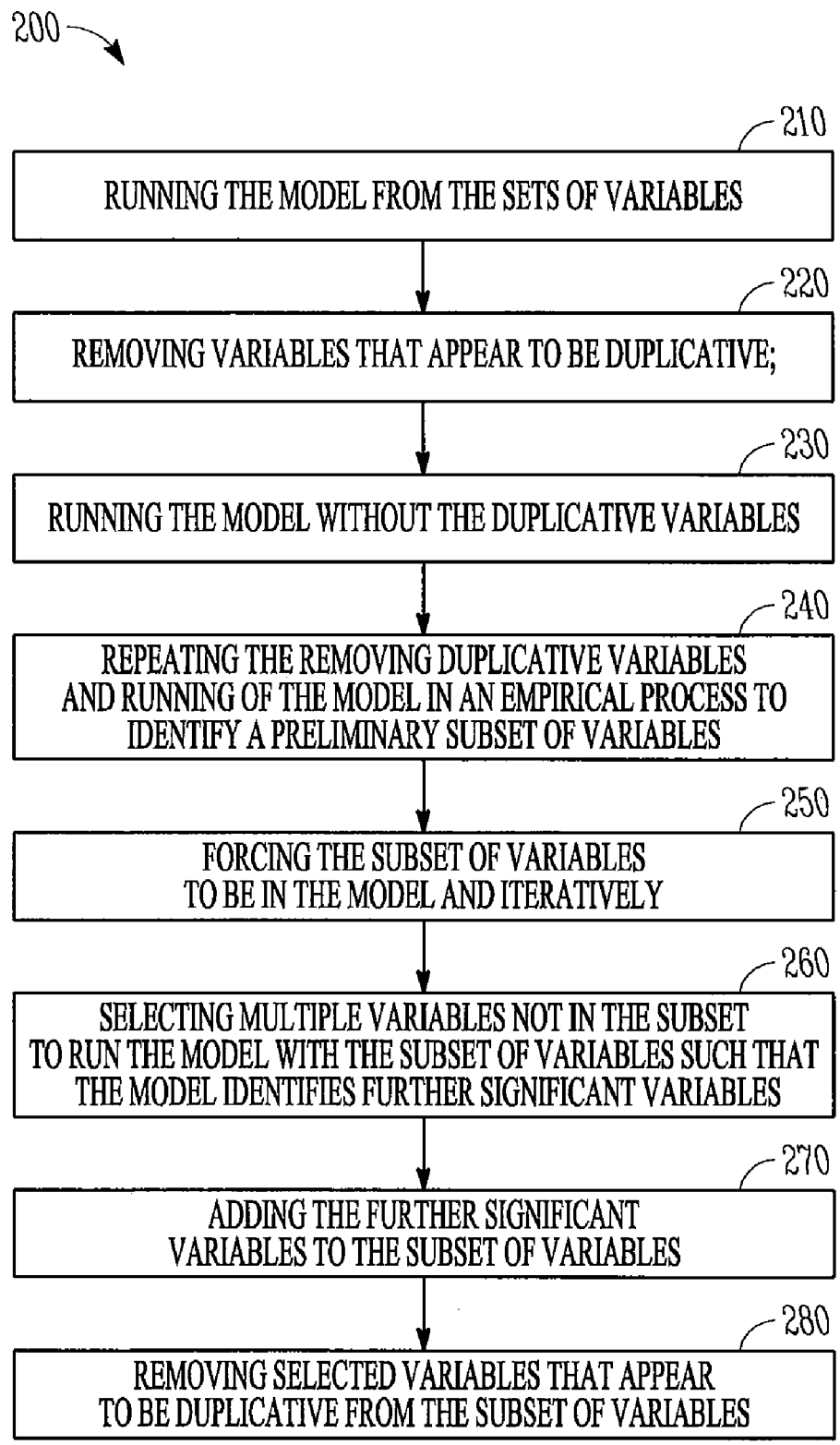
FIG. 2 is a flowchart illustrating the use of a computer assisted manual intuitive method of forming a model according to an example embodiment.

Method 200 of FIG. 2 is executed in one embodiment by using a computing platform such as system 510 which uses the an equation similar to the one following to determine the odds or probability that an estate is present or will be present for the debtor: $P(Y_i) = a + b_1(CREDIT1) + b_2(DEMOGRAPHIC1) + b_3(CHARACTERISTIC1) + \ldots b_n(Nth\_VARIABLE)$; $P(Y_i)$ is the probability of individual i opening an estate; $a, b_1, b_2, b_3, \ldots b_n$, represent the coefficients determined by computing platform 510. Probability represents the debtor having a "1" outcome, meaning an estate is or will be present. Before the computing platform 500 uses a logistical regression, the values of $a, b_1, b_2, b_3, \ldots b_n$, may be unknown.

To determine the Probate Predictor score, the computer platform from FIG. 5 may process the historical data captured from FIG. 1. A variety of quantitative techniques, such as variety of logistical regressions or neural networks, may be used to weight each of the attributes used. Statistical tools, such as software provided by the SAS Institute, Inc. or SPSS, may be utilized to determine the coefficients of the Probate model based on the data compiled in FIG. 1.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer assisted method comprising:
   selecting a sample of accounts from a historical database of accounts corresponding to deceased debtors, the sample indicating whether or not an estate was found for each deceased debtor;
   obtaining a comprehensive set of credit related variables corresponding to the accounts from a first source;
   obtaining a comprehensive set of demographic related variables corresponding to the accounts from a second source;
   obtaining individual characteristic variables for each deceased debtor;
   mapping the credit related variables, demographic related variables, and the individual characteristic variable variables to the accounts via the computer; and
   creating a computer executable model via the computer by identifying a subset of variables from the sets of variables and using the subset of variables and sample of accounts such that the model provides a prediction of whether or not an estate exists for a given deceased debtor.

2. The method of claim 1 wherein selecting a sample of accounts further comprises keeping a sample slice out of the sample for use in testing the model.

3. The method of claim 2 wherein the sample of accounts is selected from a group of accounts processed in accordance with a constant method of identifying whether or not the deceased debtors had estates.

4. The method of claim 1 wherein the first source comprises at least one credit profile source.

5. The method of claim 1 wherein the second source comprises at least one census database.

6. The method of claim 5 wherein the demographic data comprises at least a zipcode and income information.

7. The method of claim 1 wherein the historical database of accounts comprises further variables used to create the model.

8. The method of claim 1 wherein the model comprises a probit model.

9. The method of claim 8 wherein the probit model is created using a computer assisted manual intuitive model.

10. The method of claim 8 wherein the probit model is created using a stepwise logistical process.

11. The method of claim 10 wherein the stepwise logistical process comprises;
   running the model from the sets of variables;
   removing variables that appear to be duplicative;
   running the model without the duplicative variables; and
   repeating the removing duplicative variables and running of the model in an empirical process to identify a preliminary subset of variables.

12. The method of claim 11 and further comprising:
   forcing the subset of variables to be in the model and iteratively:
      selecting multiple variables not in the subset to run the model with the subset of variables such that the model identifies further significant variables;
      adding the further significant variables to the subset of variables; and
      removing selected variables that appear to be duplicative from the subset of variables.

13. The method of claim 1 wherein the model produces a z score for a selected deceased debtor.

14. The method of claim 13 wherein the z score is representative of the likelihood that an account will have an estate, and a correspondingly increased chance of collecting a debt associated with the deceased debtor.

15. The method of claim 14 wherein the z score is transformed using the standard normal distribution and a scaling equation to produce a probate prediction score.

16. A computer executable model stored on a computer readable storage device, the model comprising:
   a set of variables selected from credit and demographic data sources, the variables selected from a method comprising:

selecting a sample of accounts from a historical database of accounts corresponding to deceased debtors, the sample indicating whether or not an estate was found for each deceased debtor;

obtaining a comprehensive set of credit related variables corresponding to the accounts from a first source;

obtaining a comprehensive set of demographic related variables corresponding to the accounts from a second source;

mapping the sets of variables to the accounts; and creating a computer executable model by identifying a subset of variables from the sets of variables and using the subset of variables and sample of accounts such that the model provides a prediction of whether or not an estate exists for a given deceased debtor.

17. A computer executable model of claim 16 wherein the code comprises a probit model created using a computer assisted manual intuitive model.

18. A computer implemented method comprising:

associating credit and demographic data corresponding to a deceased debtor to a deceased debtor account stored on a computer readable storage device;

running on a programmed computer, a statistical model trained on historical deceased debtor data against the deceased debtor account; and identifying via the programmed computer, a likelihood that there is an estate corresponding to the deceased debtor account.

19. The method of claim 18 and further comprising performing the method on multiple debtor accounts and identify priority debtor accounts that are more likely to have an estate and thus an increased chance of collection to obtain higher collection yields.

20. The method of claim 18 wherein a low probate prediction score identifies an account as a candidate for reduced collection efforts.

* * * * *

UNITED STATES PATENT AND TRADEMARK OFFICE
CERTIFICATE OF CORRECTION

| | |
|---|---|
| PATENT NO. | : 8,170,895 B1 |
| APPLICATION NO. | : 12/355449 |
| DATED | : May 1, 2012 |
| INVENTOR(S) | : Andrew M. Larsen |

It is certified that error appears in the above-identified patent and that said Letters Patent is hereby corrected as shown below:

On the face page, in field (56), under "Other Publications", in column 2, line 11, delete "Univeristy" and insert -- University --, therefor.

On the face page, in field (57), under "Abstract", in column 2, line 3, delete "debtors," and insert -- debtors. --, therefor.

In column 6, lines 4-5, in Claim 1, delete "variable variables" and insert -- variables --, therefor.

Signed and Sealed this
Seventh Day of August, 2012

David J. Kappos
*Director of the United States Patent and Trademark Office*